J. V. GIESLER.
REGULATING DEVICE FOR THERMOSTATICALLY CONTROLLED VALVES.
APPLICATION. FILED FEB. 19, 1917.
1,354,740.
Patented Oct. 5, 1920.
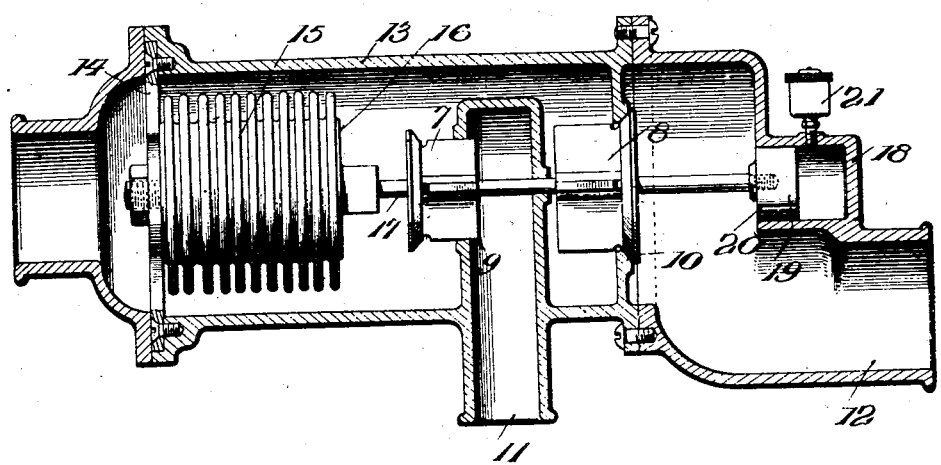
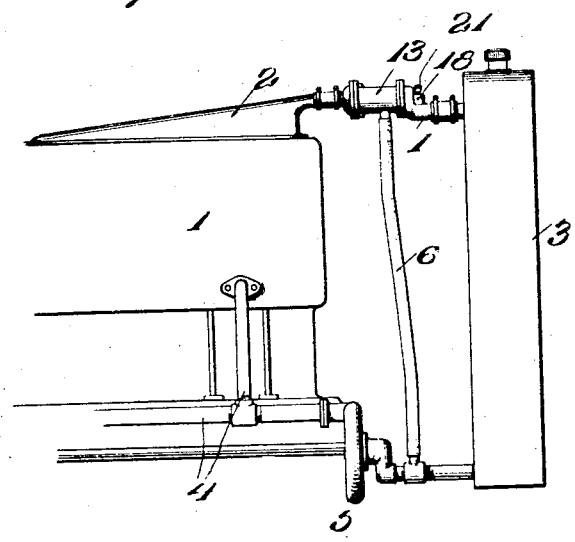
Inventor
Jean V. Giesler
By
Mauro, Cameron, Lewis & Massie Attorneys

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

REGULATING DEVICE FOR THERMOSTATICALLY-CONTROLLED VALVES.

1,354,740.   Specification of Letters Patent.   Patented Oct. 5, 1920.

Application filed February 19, 1917. Serial No. 149,634.

*To all whom it may concern:*

Be it known that I, JEAN V. GIESLER, a citizen of the United States of America, and a resident of Knoxville, Tennessee, have invented a new and useful Improvement in Regulating Devices for Thermostatically-Controlled Valves, which invention is fully set forth in the following specification.

This invention relates to the cooling systems of internal combustion engines and, while capable of use in such systems when applied to a wide variety of engines of the internal combustion type, is of particular utility when employed in the cooling systems of automobile engines.

In cooling systems of the type referred to wherein is employed a branched conduit, automatically-operated valve means for controlling the branches of said conduit, and a circulating means for passing cooling medium through either or both of said branches, it has been found that the difference in resistance offered by the respective branches to the flow of the cooling medium therethrough tends to create adverse working conditions for said valve means. Thus, when the circulation is maintained solely through the branch offering the greater resistance, a head is built up in the valve-housing, and if a thermostat be subjected to the cooling medium at this point, this head tends to oppose movement of the valve means by the thermostat in response to temperature variations in said medium. Furthermore, a head may be built up in the valve-housing due to a change in the direction of flow of the cooling medium. In either event, when the thermostat does respond to the temperature change and initiates the movement of the valve means, the relief of the excess pressure on the thermostat results in an excessive movement of the valve means to a position beyond that to which it should be moved for maintaining the proper temperature. Such excessive movement is followed by an undue heating or cooling of the medium flowing through the system and a consequent movement of the valve means by the thermostat in the opposite direction; and if this movement be opposed by an abnormal head in the valve-housing, this movement also may be excessive. Consequently, if the movement of the valve means be plotted graphically upon time as an abscissa, the graph will appear as a jagged, irregular line.

It is an object of this invention to dampen or retard the valve movement, so as to enable the temperature conditions within the system to adjust themselves in time to prevent excessive movement of the valve means, or, in other words, to eliminate the jagged irregularities of the graph representing the valve movement, to the end that such graph may appear as a smooth curve more nearly commensurate with the ideal conditions for the cooling medium flowing through the cooling system.

A further object of this invention is to provide valve means for controlling the branches of a conduit with means for governing the movement thereof to secure a more efficient and accurate adjustment of said valves.

A still further object of this invention is to provide a device of the type characterized that is simple in construction, inexpensive to manufacture, easy to install and efficient in operation.

Stated broadly, the invention comprises, in combination with a branched conduit, valve means for controlling the flow of a medium through the branches of said conduit, means preferably in the form of a thermostat for operating said valve means, and means to dampen or retard the movement of said valve means.

The invention is capable of receiving a variety of mechanical expressions, one of which is shown on the accompanying drawing, but it is to be expressly understood that such drawing is for purposes of illustration only and is not to be construed as a definition of the limits of the invention, reference being had to the appended claims for that purpose.

In said drawings,

Figure 1 is a diagrammatic elevation of a cooling system of an internal combustion engine; and Fig. 2 is a vertical cross section through the valve-housing of the system of Fig. 1, on an enlarged scale, and illustrating a preferred embodiment of the present invention.

In said drawing, wherein the same reference characters designate corresponding parts in the several figures, 1 represents the cylinders of an internal combustion engine such, for example, as is commonly employed on automobiles, the same being provided with the usual jackets through which is circulated a cooling medium in heat-interchanging relation with said cylinders. In the form shown, the cooling system for said engine comprises an outlet manifold 2 in communication with the jackets about the cylinders 1, a radiator 3 in communication with said outlet manifold 2, an inlet manifold 4 in communication with said radiator, any suitable form of pump 5 for maintaining a circulation through the system, and a by-pass 6 around said radiator 3. The passage of the cooling medium through the radiator 3 or the by-pass 6, or both, is controlled by valve means of any suitable construction, shown as connected valves 7 and 8, the former controlling the admission port 9 to the by-pass connection 11, and the latter controlling the admission port 10 to the radiator connection 12. Said valves 7 and 8 are shown as mounted within a housing 13 interposed in the cooling system between the outlet manifold 2 and the radiator 3. Mounted within the housing 13 in any suitable way, as by a bracket 14, is a thermostat 15, preferably comprising a resilient corrugated expansible and collapsible vessel charged with a thermosensitive fluid and having one end wall fixedly secured to the bracket 14 and its opposite end wall 16 connected to the valves 7 and 8 by a stem 17.

When the engine is started, the medium in the cooling system is cold, the thermostatic vessel 15 is collapsed, valve 7 is open, and valve 8 is closed. The cooling medium now flows from outlet manifold 2 through by-pass 6 and back to the jackets of the engine. As said medium warms up and reaches a predetermined temperature, it is designed that the vessel 15 shall expand, moving valve 7 toward closed position and opening valve 8. If, however, the resistance to the flow of cooling medium through the by-pass 6 is appreciably greater than to such flow through the radiator 3 (and such is frequently the case), a head must be developed in the valve-housing 13 to overcome this excess resistance, and this head or pressure in turn must be overcome by the movable wall 16 of vessel 15 before the same can expand. Therefore, to move the valves as aforementioned, an excess pressure must be created within the vessel 15, which excess pressure can only be created by the temperature of the cooling medium rising above that at which it is designed that the valves shall move as aforesaid. As soon as the valve 8 is opened, however, the abnormal head existing in the valve-housing 13 disappears and the valves are then moved too far by the excess pressure in the vessel 15. An excess of cold fluid is then drawn in from the radiator, the temperature of the system is lowered too much, and the valves are moved by the thermostatic vessel 15 in the opposite direction.

To prevent such excess movement of the valves and to allow the cooling medium to find its proper temperature before said valves move too far, means are provided in accordance with the present invention to dampen or retard their movement. Such means may take a variety of forms, that illustrated being a very simple and therefore desirable construction. In the form shown, the valve-housing 13 is provided, preferably integrally therewith, with a cylinder 18 in which works a piston 19 connected to an extension of the valve stem 17. Piston 19 is provided with a bleed opening 20, as shown. If desired, a grease cup 21 may be mounted on cylinder 18 to supply an appropriate amount of lubricating material to the interior of said cylinder to facilitate the displacement of piston 19. When the thermosensitive device overcomes the abnormal head within the valve-housing and starts to move the valves to open the radiator and close the by-pass, their movement is retarded or dampened, since said valves can move only so fast as is permitted by the flow of fluid within the cylinder 18 through the bleed opening 20 into the main conduit. Before said valves can move too far, the head within the valve-housing has been relieved and the cold fluid flowing into the system from the radiator 3 has brought the temperature of the cooling medium to substantially the desired degree, reducing the pressure within the thermosensitive vessel 15 and therefore overcoming the excess movement of said valves heretofore referred to.

Obviously the piston 19 will also similarly retard movement of the valves in the opposite direction and prevent excess movement thereof in the way heretofore explained. The retarding device provided will also obviously compensate for tendencies to move the valves too far owing to other excessive heads created in the system, and will tend to oppose irregular and excessive movement of the valves, whatever be the cause for such movements.

While the embodiment illustrated on the drawing has been described with considerable particularity, it is to be expressly understood that the invention is not to be restricted to the form shown, as it is capable of receiving other mechanical expressions some of which will readily suggest themselves to those skilled in the art. Reference is therefore to be had to the claims hereto appended for a definition of the limits of the invention.

What is claimed is:

1. In combination with an internal combustion engine and its system for circulating a cooling medium in heat-interchanging relation with said engine, said system including a branched conduit, valve means controlling the branches of said conduit, an expansible and collapsible vessel subjected to the pressure of the medium in said conduit for operating said valve means, and means for damping the movement of said valve means.

2. In combination with an internal combustion engine and its system for circulating a cooling medium in heat-interchanging relation with said engine, said system including a branched conduit, valve means controlling the branches of said conduit, thermosensitive means subjected to the medium in said conduit for operating said valve means, and means for damping the movement of said valve means.

3. In combination with an internal combustion engine and its system for circulating a cooling medium in heat-interchanging relation with said engine, said system including a branched conduit, valve means controlling the branches of said conduit, an expansible and collapsible vessel for operating said valve means, and means for damping the movement of said valve means.

4. In combination with an internal combustion engine and its system for circulating a cooling medium in heat-interchanging relation with said engine, said system including a branched conduit, valve means controlling the branches of said conduit, a thermostat for operating said valve means, and means for damping the movement of said valve means.

5. In combination with an internal combustion engine and its system for circulating a cooling medium in heat-interchanging relation with said engine, said system including a branched conduit, valve means controlling the branches of said conduit, means subjected to the pressure of the medium in said conduit for operating said valve means, and means for damping the movement of said valve means.

6. In combination with an internal combustion engine and its system for circulating a cooling medium in heat-interchanging relation with said engine, said system including a radiator and a by-pass therearound, valve means controlling the passage of cooling medium through said radiator and by-pass, means subjected to said cooling medium for operating said valve means, and means for damping the movement of said valve means.

7. In combination with a branched conduit, valve means controlling the branches of said conduit, an expansible and collapsible vessel subjected to the pressure of the fluid in said conduit for operating said valve means, and means for damping the movement of said valve means.

8. In combination with a branched conduit, valve means controlling the branches of said conduit, thermosensitive means subjected to the fluid in said conduit for operating said valve means, and means for damping the movement of said valve means.

9. In combination with a branched conduit, valve means controlling the branches of said conduit, an expansible and collapsible vessel for operating said valve means, and means for damping the movement of said valve means.

10. In combination with a branched conduit, valve means controlling the branches of said conduit, a thermostat for operating said valve means, and means for damping the movement of said valve means.

11. In combination with a branched conduit, valve means controlling the branches of said conduit, automatic means for operating said valve means, subjected to the pressure of the medium in said conduit, and means for damping the movement of said valve means.

12. In combination with a branched conduit, valve means controlling the branches of said conduit, means subjected to the medium in said conduit for operating said valve means, and means for damping the movement of said valve means.

In testimony whereof I have signed this specification.

JEAN V. GIESLER.